(No Model.) 2 Sheets—Sheet 1.

M. LYTCH.
MEAT CUTTING MACHINE.

No. 521,886. Patented June 26, 1894.

Witnesses
John Jamme
F. H. O'Farrell

Inventor
Milton Lytch
By Patrick O'Farrell
Attorney

THE NATIONAL LITHOGRAPHING COMPANY,
WASHINGTON, D. C.

(No Model.) 2 Sheets—Sheet 2.
M. LYTCH.
MEAT CUTTING MACHINE.
No. 521,886. Patented June 26, 1894.
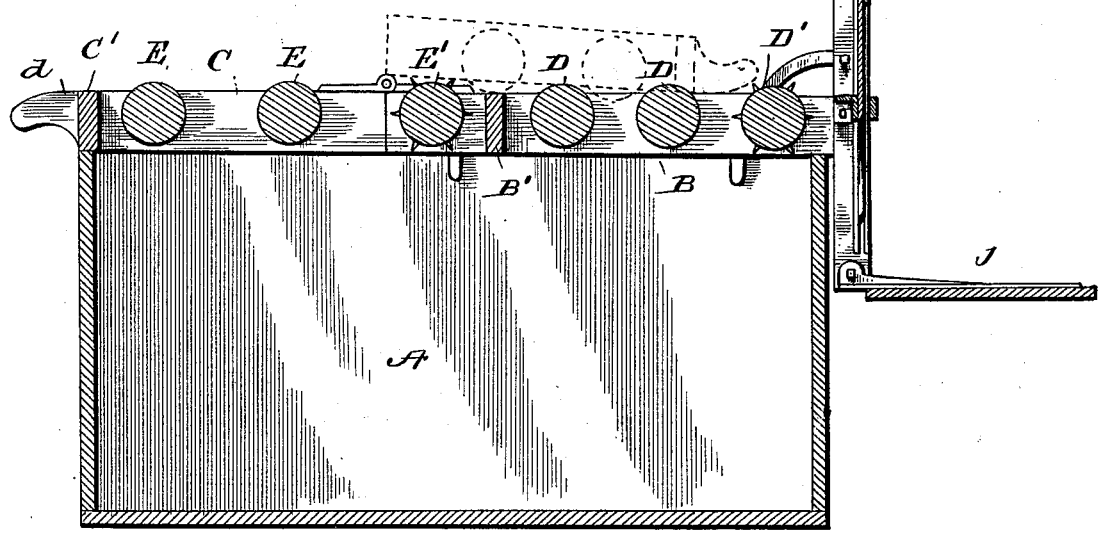
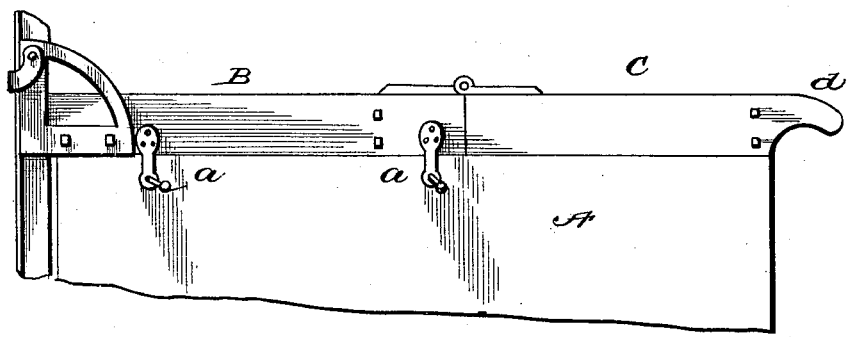
Witnesses
Inventor
Milton Lytch
By Patrick O'Farrell
Attorney

UNITED STATES PATENT OFFICE.

MILTON LYTCH, OF ROWLAND, NORTH CAROLINA, ASSIGNOR TO ROSANNA LYTCH, OF SAME PLACE.

MEAT-CUTTING MACHINE.

SPECIFICATION forming part of Letters Patent No. 521,886, dated June 26, 1894.

Application filed August 23, 1893. Serial No. 483,803. (No model.)

*To all whom it may concern:*

Be it known that I, MILTON LYTCH, a citizen of the United States of America, residing at Rowland, in the county of Robeson and State of North Carolina, have invented certain new and useful Improvements in Meat-Cutting Machines, of which the following is a specification, reference being had therein to the accompanying drawings.

My invention relates to meat cutting machines, and is especially intended to cut bacon for retail when sold in small quantities. And it has for its object to prevent the constant handling of large and heavy pieces of meat when only a small quantity is needed.

In carrying out my invention I provide a horizontal frame consisting of side bars, formed in two sections on each side and pivotally united near their mid-length, the side bars of each section being rigidly connected transversely by means of suitable cross-bars. One set of these cross-bars are also connected at one end by means of an approximately rectangular frame, that stands vertically to said bars and forms the front of the machine. This rectangular frame has downwardly projecting arms which support at their lower extremities a shelf upon which the meat falls when it has been cut into pieces of the proper size. In the vertical frame proper is adjusted a knife for cutting the meat as it is fed to it by a series of rollers journaled in the horizontal frame, the knife being operated by a suitable lever and the feed rollers by cranks.

The machine when so constructed may be mounted upon any suitable base, but I prefer to locate it on a box or other receptacle which may contain a supply of meat and have accordingly shown it so mounted.

Figure 1:
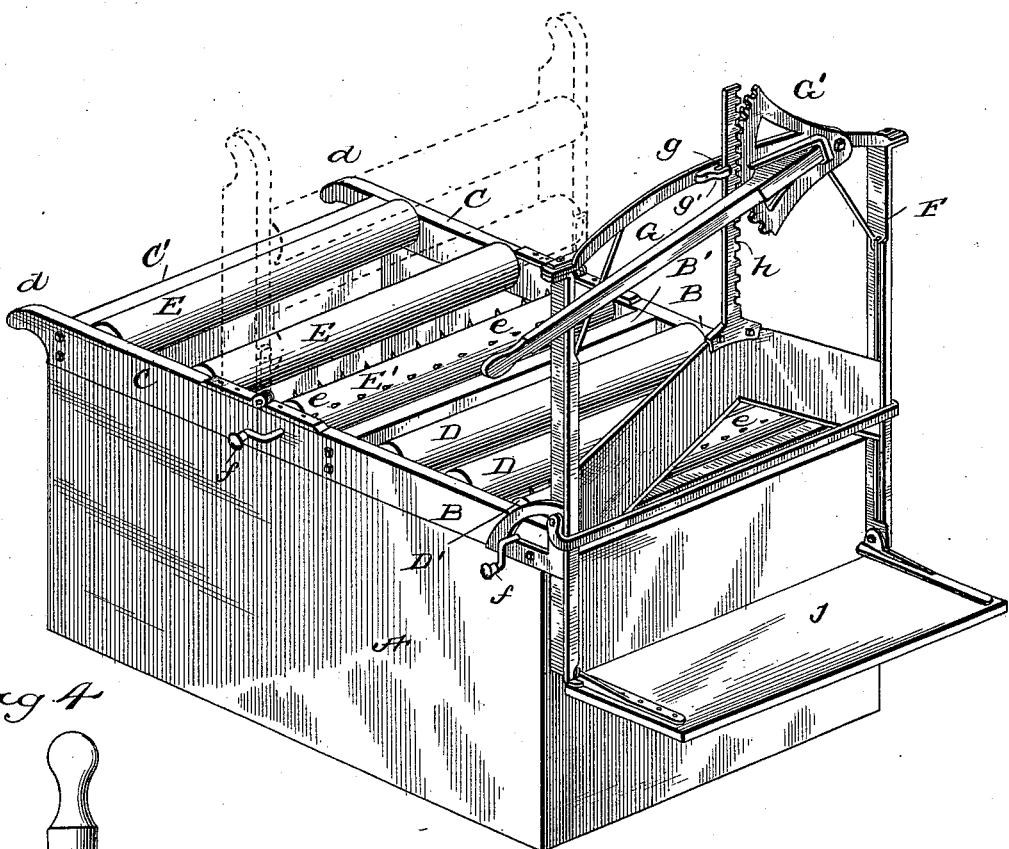
Figure 4:
Figure 5:
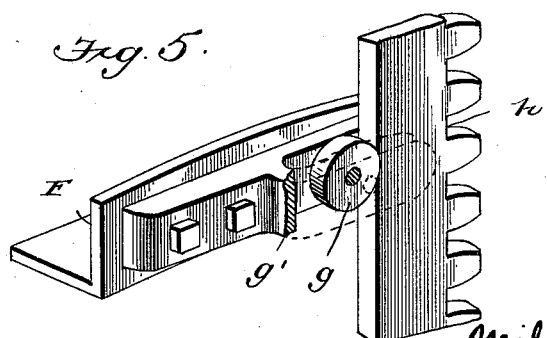

In the accompanying drawings, Figure 1, is a perspective view, showing my machine in position, the knife being elevated and ready for use. Fig. 2, is a vertical and longitudinal section. Fig. 3, is a detail showing one side of the machine and the clamps for connecting it to the box or support. Fig. 4, represents a hook for handling the meat when it is to be placed on the machine. Fig. 5, is a fragmentary view showing the friction pulley for connecting the knife bar.

Like reference letters indicate corresponding parts in the several views.

Referring to the parts more particularly, A indicates the base or box upon which the machine is mounted and held to position by clamps $a\ a$. (See Fig. 3.)

B B are horizontal bars connected by a transverse bar B'. To these bars are pivoted bars C C which are likewise connected by a transverse bar C' and terminating in handles $d\ d$. Transversely between the bars B B and C C are journaled rollers D D' and E E', two of which, D' and E' are provided on their cylindrical faces with a series of short pins $e\ e$, and to the ends of the journals on each side of the frame are attached cranks $f\ f$.

To the ends of the bars B B and vertical thereto, is secured the approximately rectangular frame F, the lower cross-bar of which closes the front, and unites the ends of the bars B B forming a cutting edge which co-operates with the knife when in operation, while the vertical sides are grooved on their inner edges so as to form guides for the reciprocating blade, while upon the transom or upper crossbar, is pivoted the lever G, which carries a toothed segment G', the teeth of said segment meshing with teeth on a vertical bar $h$ attached to the knife blade mid-way of its length by which a reciprocating motion is imparted to the knife as the lever is raised and lowered. The knife edge approximates in form, the two sides of a triangle, and with the lower cross-bar of the frame (which is stationary) forms a cutting implement that has a drawing or shearing action when in operation.

To prevent the action of the segment G' from forcing the bar $h$ to one side and binding the blades in the grooves, I place at the back of said bar immediately opposite the meshing of the segment teeth therewith a roller $g$ which is secured in a bracket $g'$ attached to the upper cross-bar.

The operation of the machine is as follows: The rear portion of the horizontal part of the machine is folded over onto the front portion in the manner indicated in dotted lines Fig. 2, when the operator takes the hook H, and engages it with the meat to be cut, draws it from the receptacle underneath the machine which has been opened by the turning over of the rear part, and then turning the overlapping frame and rollers back to position the meat is laid upon the rollers and advanced by turning the roller having the projecting pins until the meat is far enough advanced under the knife to allow of the cutting off of the needed portion when the knife is brought down by means of the lever G and the severed portion of meat drops upon the board J from which it is removed for weighing and delivery, or the scales may be placed on the board and the meat can fall directly from the knife upon them, when it can be weighed before removal. The board J is pivoted and when the machine is to be packed for shipment, or when not in use the board may be turned up out of the way.

Having thus described my invention, what I claim as new, and desire to secure by Letters Patent, is—

1. In a meat cutter, two frames pivotally connected, each containing two or more supporting or feeding rollers, one frame being adapted to fold upon the other, and the rollers of the folding frame being adapted to fall between the rollers of the stationary frame when folded, as and for the purpose specified.

2. The herein specified meat cutter composed of a box, rollers arranged across the box, some of the rollers having pins to engage with and positively feed the meat and adapted to be rotated by hand, a pivoted frame carrying a number of the rollers at one end of the box and adapted to be turned up, a frame F having its lower ends extended, a board J pivoted to the extended ends of the said frame F, a reciprocating knife having a rack bar, and a segment lever for operating the said knife, substantially as set forth.

In testimony whereof I affix my signature in presence of two witnesses.

MILTON LYTCH.

Witnesses:
RALPH WORMELLE,
ALFRED J. O'FARRELL.